US00RE37275E

(19) United States
(12) Reissued Patent
Bogdan

(10) Patent Number: US RE37,275 E
(45) Date of Reissued Patent: *Jul. 10, 2001

(54) FOOD SLICES AND METHOD FOR MAKING SAME

(75) Inventor: Jeffrey A. Bogdan, Sandwich, IL (US)

(73) Assignee: PJ Squares LLC, Glen Ellyn, IL (US)

( * ) Notice: This patent is subject to a terminal disclaimer.

(21) Appl. No.: 09/560,084

(22) Filed: Apr. 27, 2000

Related U.S. Patent Documents

Reissue of:
(64) Patent No.: 5,855,939
Issued: Jan. 5, 1999
Appl. No.: 08/734,239
Filed: Oct. 21, 1996

U.S. Applications:

(63) Continuation of application No. 08/274,247, filed on Jul. 13, 1994, now Pat. No. 5,567,454.

(51) Int. Cl.[7] ..... A23L 1/06
(52) U.S. Cl. ..... 426/93; 426/103; 426/123; 426/573; 426/633; 426/102; 426/106; 426/389; 426/414
(58) Field of Search ..... 426/93, 102, 103, 426/106, 108, 123, 124, 389, 396, 414, 573, 633, 249, 639

(56) References Cited

U.S. PATENT DOCUMENTS

| | | | | |
|---|---|---|---|---|
| 1,578,122 | | 3/1926 | Higgins | 426/90 |
| 3,044,883 | | 7/1962 | Ferguson, Jr. | 426/93 |
| 3,117,871 | | 1/1964 | Bahr et al. | 426/653 |
| 3,552,980 | | 1/1971 | Cooper et al. | 426/93 X |
| 3,615,591 | | 10/1971 | Newlin et al. | 426/90 |
| 3,969,514 | | 7/1976 | Tiemstra | 426/103 |
| 3,969,536 | | 7/1976 | Ikeda et al. | 426/90 |
| 5,034,242 | | 7/1991 | Lasdon et al. | 426/633 |
| 5,567,454 | * | 10/1996 | Bogdan | 426/93 |

* cited by examiner

*Primary Examiner*—Milton Cano
(74) *Attorney, Agent, or Firm*—Welsh & Katz, Ltd.

(57) ABSTRACT

Nut butter and jelly food slices are provided. They preferably include a first layer of jelly and a second layer of jelly disposed in contacting relationship with the first layer of jelly. The first and second layers of jelly cooperate to define a hollow region therebetween. A volume of nut butter is placed within the hollow region, and is thereby totally encapsulated between the first and second layers of jelly. Also provided is a method and apparatus for making nut butter and jelly slices. Finally, a jelly slice dimensioned to fit on a food substrate and jelly suitable for making jelly slices or nut butter and jelly slices are provided. The jelly slices and the nut butter and jelly slices may be individually wrapped in flexible coverings and packaged in a single food container.

22 Claims, 3 Drawing Sheets

FOOD SLICES AND METHOD FOR MAKING SAME

Matter enclosed in heavy brackets [ ] appears in the original patent but forms no part of this reissue specification; matter printed in italics indicates the additions made by reissue.

CROSS REFERENCE TO RELATED APPLICATION

The present application is a continuation of application Ser. No. 08/274,247, filed Jul. 13, 1994, now U.S. Pat. No. 5,567,454.

BACKGROUND OF THE INVENTION

This invention relates generally to the field of nut butter and jelly food products, and more particularly to a pre-formed nut butter and jelly slice and a method and apparatus for making such slices.

The combination of peanut butter and jelly has been, and continues to be, a favorite and desirable food product for people of all ages. In fact, one could say that peanut butter and jelly sandwiches have been a staple lunchbox food for years.

Traditionally, peanut butter and jelly products have been marketed and sold separately in individual jars or other suitable containers. To make a sandwich, an hors d'oeuvre or other food product, peanut butter and jelly are taken from the individual containers and spread on a piece of bread, a cracker or other suitable food substrate.

To decrease the time and effort required to make peanut butter and jelly food products, and also to lessen the mess generated in the process, peanut butter and jelly have been combined and packaged together in a single container. Usually, as shown and described in U.S. Pat. Nos. 3,117,871, 3,552,980 and 3,615,591, the peanut butter and the jelly have been swirled and/or layered together in the food containers. The swirled layers are intended to allow one who is making a peanut butter and jelly food product to retrieve a sufficient amount of both peanut butter and jelly to make a tasty sandwich or other treat.

While the above-described peanut butter and jelly packaging techniques have proven to be satisfactory, one must still remove the peanut butter and jelly from the respective container(s) to spread it on a food substrate, such as bread or crackers. This removal and spreading process is time consuming and messy, especially for smaller children. Therefore, a peanut butter and jelly packaging technique that allows for the ready and mess-free use of peanut butter and jelly would be advantageous.

SUMMARY OF THE INVENTION

The present invention provides a pre-formed nut butter and jelly food slice that enables a person of any age to easily and quickly make a nut butter and jelly sandwich, or other food product, without the fuss and mess associated with prior techniques for packaging nut butter and jelly. The nut butter and jelly food slice comprise at least one layer of jelly and at least one layer of nut butter. Preferably the nut butter is peanut butter.

According to a preferred embodiment of the present invention, the nut butter and jelly food slice includes a first and a second layer of jelly disposed in contacting relationship with each other. The first and second layers of jelly cooperate to define a hollow region therebetween. A volume of nut butter is disposed within the hollow region such that the volume of nut butter is encapsulated between the first and second layers of jelly.

According to a specific example of the preferred embodiment of the nut butter and jelly food slice, the slice includes a first layer of jelly having a recess therein. A layer of nut butter is disposed within the recess in the first layer of jelly. A second layer of jelly is disposed over the first layer of jelly and the layer of nut butter, such that the layer of nut butter is encapsulated between the first and second layers of jelly.

The invention further provides a method of forming a nut butter and jelly food slice which includes the steps of: forming a first layer of jelly having a raised edge to define a recess therein; depositing a layer of nut butter within the recess formed in the first layer of jelly; and forming a second layer of jelly over the first layer of jelly and the layer of nut butter to encapsulate the layer of nut butter between the first and second layers of jelly.

According to another aspect of the present invention, an apparatus for forming a nut butter and jelly slice includes, in combination, a first mold having a bottom surface having a recessed edge around the perimeter thereof, and a second mold. The first mold is operable to contain a first layer of molten jelly that is placed therein to form a first solidified layer of jelly having a raised edge and a recessed area. The second mold includes a bottom surface and a raised perimeter wall connected to the bottom surface. The second mold is operable to contain the first solidified layer of jelly formed in the first mold, a layer of nut butter deposited within the recess formed in the first solidified layer of jelly, and a second layer of molten jelly that is placed over the first solidified layer of jelly and the layer of nut butter to form a second solidified layer of jelly. The layer of nut butter is encapsulated between the first and second solidified layers of jelly.

The present invention also provides a pre-formed food slice comprising at least one pre-formed layer of jelly dimensioned to fit on a food substrate. Suitable food substrates include bread, and the food slice can be used to prepare a jelly sandwich.

The present invention further provides jelly suitable for preparing the jelly food slices and the nut butter and jelly food slices of the invention. The jelly comprises: fruit juice; a volume of water approximately equal to the volume of fruit juice; about 0.5 cup sugar per cup of fruit juice; about 1 tablespoon pectin per cup of fruit juice; about 2 tablespoons gelatin per cup of fruit juice; about 1 tablespoon vegetable oil per cup of fruit juice; and about 2 teaspoons food starch per cup of fruit juice.

The present invention also provides a pre-formed and pre-packaged food product which includes a flexible package covering having a first cover portion having a bottom wall and at least one side wall connected to the bottom wall. The bottom wall and the side wall cooperate to define an open recessed area. A second cover portion is removably connected to the side wall and extends across the open recessed area. A food slice according to the invention (jelly alone or nut butter and jelly) is disposed within the open recessed area defined in the first cover portion of the flexible package covering.

Finally, the invention provides a food product package which includes a food container having a bottom wall, at least one raised perimeter wall connected to the bottom wall, and a lid removably secured to the raised perimeter wall. The bottom wall and the raised perimeter wall cooperate to define a recess. A plurality of food slices (jelly alone or nut butter and jelly) are disposed within the food container.

The food slices of the present invention (jelly alone or nut butter and jelly) are firm yet flexible, and can be rolled up and eaten by hand. Alternatively, they can be used to prepare a food item, such as a sandwich, without the usual fuss and mess. The food slices of the invention may be formed in any suitable shape or size, including, for example, comic characters. In addition, multiple food slices may be packaged together in a single container.

These and other features and advantages of the present invention will become apparent to those skilled in the art upon review of the following detailed description of the presently preferred embodiments of the invention taken in conjunction with the accompanying drawings.

DETAILED DESCRIPTION OF THE PRESENTLY PREFERRED EMBODIMENTS

Initially, it should be understood that the terms "nut butter" and "jelly" are not intended to be limiting. Rather, "nut butter" is intended to include any and all food products made from nuts (for example, peanuts, walnuts, almonds and pecans) or from seeds (for example, sunflower seeds) and processed into a spreadable cream. Furthermore, "nut butter" is intended to include "crunchy," as well as "creamy" nut butters and chopped nuts and seeds. The nut butter is preferably peanut butter. Methods and ingredients for making nut butters are well known in the art.

Similarly, "jelly" is intended to include any gelled fruit-flavored food product, including all types of jellies, jams, preserves, marmalades, fruit butters and the like. Methods and ingredients for making jellies are well known in the art. Jelly suitable for preparing the food slices of the present invention (jelly alone or nut butter and jelly food slices) must be flexible, but strong enough to retain its shape when handled. It must also not be so sticky that it adheres to the fingers or its packaging. In order to achieve the proper consistency, a gelling agent must be used in preparing the jelly. Suitable gelling agents are well known in the art and include pectin, gelatin, and agar. Preferably a combination of about 2.5–4.0% (v/v relative to the volume of flavored liquid used in making the jelly) pectin and about 5.0–8.0% (v/v relative to the volume of flavored liquid used in making the jelly) gelatin is used. Food starch is also used in the jelly, and about 1.5–2.75% (v/v relative to the volume of flavored liquid used in making the jelly) food starch is preferably used. In addition, the jelly preferably contains vegetable oil. The vegetable oil is added to reduce the amount of moisture (jelly is substantially water-based) that comes into contact with the peanut butter. By reducing moisture contact with the peanut butter, spoilage of the peanut butter will be reduced and, thus, its shelf life will be increased. Preferably about 2.5–4.0% (v/v relative to the volume of flavored liquid used in making the jelly) vegetable oil is used.

Figure 1:
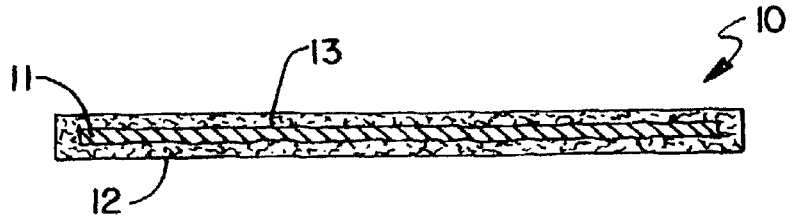
FIG. 1 is a cross-sectional view of a presently preferred embodiment of a peanut butter and jelly slice of the present invention.

Referring now to the drawings, FIG. 1 shows a peanut butter and jelly food slice 10 according to the present invention. As shown, a layer of peanut butter 11 is totally encapsulated in a hollow region formed between a bottom layer 12 and an upper layer 13 of jelly. By encapsulating the peanut butter layer 11 between the jelly layers 12, 13, the peanut butter will remain creamy and will not experience so-called "browning".

The peanut butter and jelly slice 10 may be formed in any suitable shape or size, including comic or other characters such as Mickey Mouse. Preferably, however, the peanut butter and jelly slice 10 is sized to fit onto a slice of bread (about 3.5" wide by 4.0" long) and is about ⅜" thick. In addition, the peanut butter and jelly slice 10 may be sized to fit onto crackers and the like to form hors d'oeuvres.

Figure 2:
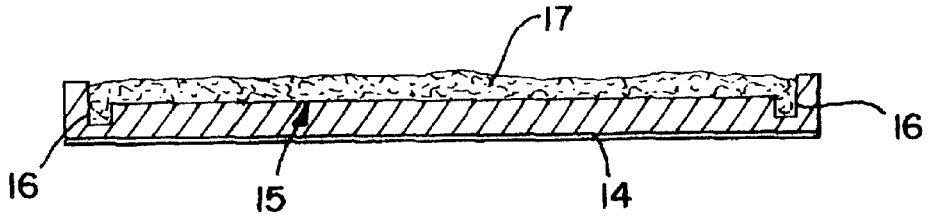
FIG. 2 is a cross-sectional view of a mold containing and forming a layer of jelly.

FIGS. 2–5 depict a preferred apparatus and method for forming the peanut butter and jelly slice 10 of the present invention. As best shown in FIG. 2, first mold 14 for forming a peanut butter and jelly slice 10 includes a bottom surface 15 and a recessed edge 16 disposed around the perimeter thereof. Molten jelly is poured into the first mold 14 to form a first layer of jelly 17. The first jelly layer 17 is cooled or chilled until it solidifies.

When a standard home refrigerator is used to cool the first jelly layer 17, approximately 30 minutes is required for the jelly layer 17 to solidify. However, it is contemplated that the time period for solidifying the first jelly layer, and also the second jelly layer 24 discussed below, can be substantially reduced by using industrial refrigeration and freezing equipment and applications.

Figure 3:
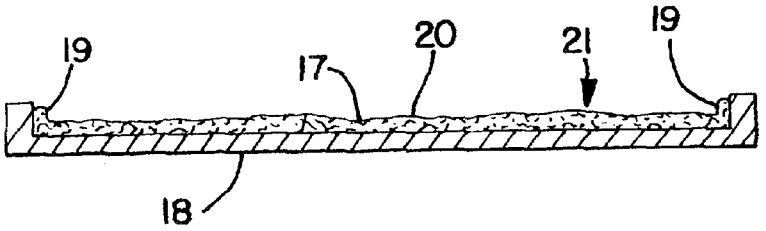
FIG. 3 is a cross-sectional view showing the layer of jelly formed in FIG. 2 positioned in a second mold.

As shown in FIG. 3, after the first jelly layer 17 has solidified in the first mold 14, the jelly layer 17 is removed from the first mold 14 and placed in a second mold 18. The first jelly layer 17 is orientated in the second mold 18 such that the raised edge 19 of the jelly layer 17 formed by the recessed edge 16 defined in the bottom surface 15 of the first mold 14 extends upwardly. The raised edge 19 and the inner surface 20 of the first jelly layer 17 define a recessed area 21.

Figure 4:
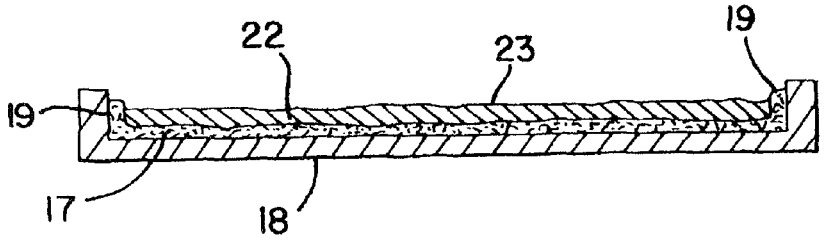
FIG. 4 is a cross-sectional view of the second mold showing a layer of peanut butter disposed within the recess formed in the layer of jelly.

Peanut butter is then dispensed into the recessed area 21 defined in the first jelly layer 17, as shown in FIG. 4, to form a layer 22 thereof. Preferably, the amount of peanut butter poured into the recessed area 21 is such that the top surface 23 of the peanut butter layer 22 is level with the top of the raised edge 19 of the first jelly layer 17. Alternately, however, any suitable amount of peanut butter may be poured into the recessed area 21.

Figure 5:
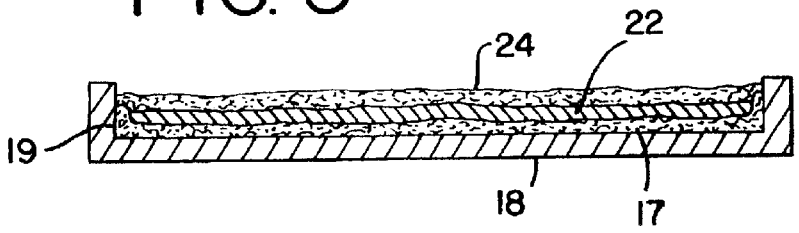
FIG. 5 is a cross-sectional view of the second mold showing a second layer of jelly disposed on the first layer of jelly and the layer of peanut butter.

Next, as shown in FIG. 5, molten jelly is poured on top of the first jelly layer 17 and the peanut butter layer 22 to form a second jelly layer 24. The addition of the second jelly layer 24 causes the peanut butter layer to be completely encapsulated between the two jelly layers 17, 24. As with the first jelly layer 17, the second jelly layer 24 is cooled or chilled until it solidifies. To insure that the second jelly layer 24, and also the first jelly layer 17, is completely solidified, the resultant peanut butter and jelly slice shown in FIG. 5 may be cooled in a standard home refrigerator for approximately one hour.

Preferably, the first and second jelly layers 17, 24 and the layer of peanut butter 22 are each ⅛" thick, which results in a peanut butter and jelly food slice 10 that is ⅜" thick. In addition, the raised edge 19 is preferably ¼" thick to adequately encapsulate the peanut butter layer 22. Alternately, however, the layers of peanut butter and jelly can be formed in various and differing thicknesses to form the peanut butter and jelly food slice 10.

Figure 6:
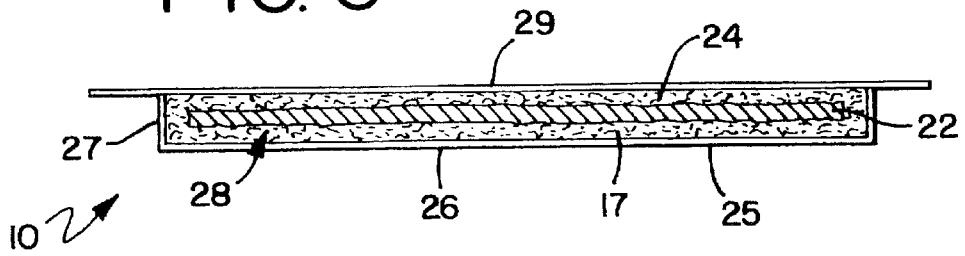
FIG. 6 is a cross-sectional view of a packaged peanut butter and jelly slice of the present invention.

The resultant peanut butter and jelly slice 10 is then removed from the second mold 18 and packaged. As shown in FIG. 6, the peanut butter and jelly slice 10 is preferably placed on a thin paperboard 25 or similar substrate to add rigidity to the food slice 10. The food slice 10 is then sealingly wrapped in a flexible covering 29 of plastic-type material. The covering 29 may then be removed from the substrate 25 to gain access to the food slice 10.

Preferably, as shown in FIG. 6, the substrate 25 includes a bottom wall 26 and at least one side wall 27 connected thereto. The bottom wall 26 and the side wall 27 cooperate to define an open recessed area 28. The open recessed area 28 is sized to receive and hold the peanut butter and jelly slice 10 described above. The covering 29 is disposed over the open recessed area 28 and removably connected to the side wall 27 to seal the peanut butter and jelly slice 10 therein. When access to the peanut butter and jelly slice 10 is desired, the covering 29 is removed from the side wall 27 to uncover the food slice 10.

Figure 8:
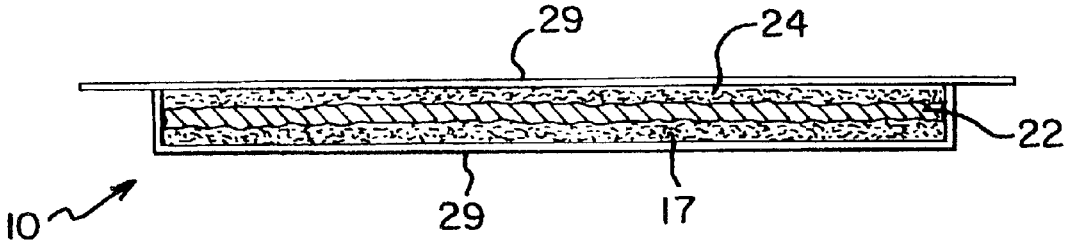
FIG. 8 is a cross-sectional view of another packaged peanut and jelly slice of the present invention.

Preferably, as stated above, the substrate 25 is formed from a paperboard substance and the covering 29 is formed from a flexible plastic-type material. Alternately, the substrate 25 may be formed of a flexible plastic-type material that is the same as or different from that of which the covering 29 is formed, as shown in FIG. 8. Moreover, the food slice packages could be the same as or similar to the packaging used in the industry to package single cheese slices.

Figure 7:
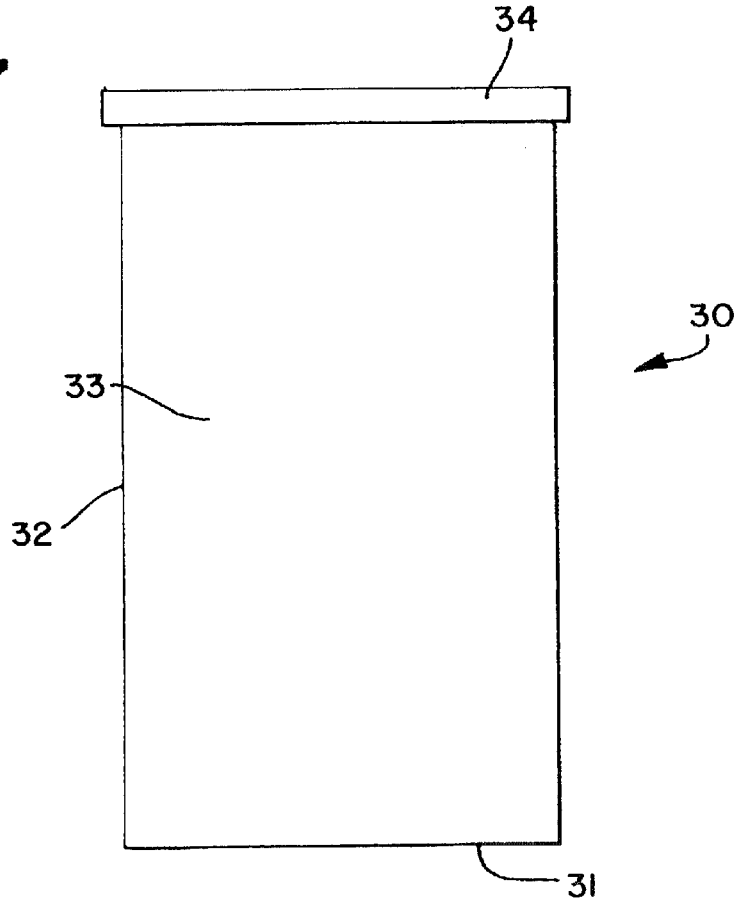
FIG. 7 is an elevational view of a food container for containing multiple peanut butter and jelly slices of the present invention.

Multiple peanut butter and jelly food slices of the present invention can be stacked and packaged together in a single food container. As shown in FIG. 7, in a preferred embodiment of the present invention, the food container 30 includes a bottom wall 31 and at least one raised perimeter wall 32 connected to the bottom wall 31. The bottom wall 31 and the raised perimeter wall 32 cooperate to define a chamber 33. A lid 34 is removably secured to the raised perimeter wall 32 to seal the food container 30. To accommodate the size and shape of the peanut butter and jelly food slices 10 contained therein, the food container 30 can be formed in any suitable size and shape.

While the peanut butter layer is completely encapsulated in jelly in the preferred embodiment of the present invention, it is specifically contemplated that peanut butter and jelly slices having a different structure can be formed. For example, a peanut butter and jelly slice can be formed from single layers of peanut butter and jelly (i.e., one layer of peanut butter on top of one layer of jelly). Each layer of peanut butter and each layer of jelly in such a slice is thin (i.e., the depth of the layer is substantially less than its other dimensions), the layers preferably being about ⅛" in depth.

The presently preferred recipe for making the peanut butter and jelly used to form the food slice 10 of the present invention is presented below.

EXAMPLE

JELLY 1 cup juice (apple, grape, strawberry)

1 cup water 2 tablespoons gelatin 1 tablespoon fruit pectin 3 teaspoons vegetable oil 2 teaspoons food starch ½ cup sugar Heat juice, water, and oil to boiling over medium heat, stirring occasionally. Add remaining ingredients slowly while stirring constantly. Boil for 3 minutes.

PEANUT BUTTER 3 cups roasted peanuts 1 teaspoon salt 1 teaspoon molasses 1 teaspoon sugar 1½ tablespoon vegetable shortening Process peanuts in food processor until peanuts become creamy. Add remaining ingredients while processing for 1 minute.

The peanut butter and jelly formed according to the above-described Example is of such a consistency that the food slice 10 of the present invention can be rolled up and eaten by hand and/or formed into various shapes and sizes. The above-specified amounts of gelatin, fruit pectin and food starch provide the jelly with optimal flexibility and shape-retaining qualities. Additionally, the use of vegetable shortening in the peanut butter has been found to increase the shelf-life of the peanut butter. Further, the jelly may be formed in various flavors, including grape, apple, strawberry, peach, boysenberry, raspberry, cherry and banana, and pieces of fruit may be added.

The peanut butter and jelly food slice 10 of the present invention provides a means for allowing a person of any age, especially children, to quickly, simply and cleanly make a peanut butter and jelly sandwich or other food product. The food slice 10 retains the taste qualities of peanut butter add jelly found in traditional, separately packaged spreads. In addition, the food slice 10 is firm yet flexible, and can be formed in any suitable shape or size, including round, square, symmetrical and asymmetrical shapes. Moreover, according to the present invention, the peanut butter and jelly slices 10 can be pre-formed and individually wrapped for packaging in a larger food container.

A peanut butter and jelly slice, a method and apparatus for making it, and packaging for it have been described. Those skilled in the art will recognize that other nut butters could be substituted for the peanut butter in the products and methods described above.

The invention also provides a pre-formed food slice comprising at least one pre-formed layer of jelly dimensioned to fit on a food substrate. Suitable food substrates include bread and crackers. The food slice may be any shape, including round, square, symmetrical and asymmetrical shapes. For instance, the food slice could take the shape of comic or other characters. Preferably, however, the food slice is sized to fit onto a slice of bread (about 3.5" wide by 4.0" long) and is about ⅛" to about ¼" thick, and the food slice is used to prepare a jelly sandwich.

This food slice may be prepared by pouring molten jelly into a suitable mold of desired shape and dimensions, followed by cooling until the jelly is gelled. The cooled jelly slice is removed from the mold and can be packaged as described above for the peanut butter and jelly slice 10. A preferred recipe for making the jelly used to form the jelly slice is that given above in the Example.

It should be appreciated that the present invention may be performed or configured as appropriate for the application.

The embodiments described above are to be considered in all respects only as illustrative and not restrictive. Changes may be made without departing from the invention. The scope of the invention is indicated by the following claims rather than by the foregoing description. All changes which come within the meaning and range of equivalency of the claims are to be embraced within their scope.

I claim:

1. A pre-packaged food product comprising:

a flexible package covering comprising:

a bottom portion defining an upwardly open area, and a top portion connected to the bottom portion and removably extending upwardly over and about the open area defined by the bottom portion to close off the bottom portion; and a nut butter and jelly food slice consisting of a first layer of jelly, a layer of nut butter disposed on and of substantially equal planar dimension to the first layer of jelly, and a second layer of jelly disposed on and of substantially equal planar dimension to the layer of nut butter, disposed within the bottom portion with the nut butter layer encapsulated by the jelly layers and the flexible package covering when said top portion thereof closes off said bottom portion thereof.

2. The food product of claim 1 wherein the bottom portion of the flexible package covering comprises a bottom wall and at least one side wall connected to the bottom wall, the bottom wall, and the at least one side wall cooperating to define the upwardly open area.

3. A pre-packaged food product comprising:

a flexible package covering comprising:

a bottom portion defining an upwardly open area, and a top portion removably connected to the bottom portion and extending over the upwardly open area defined in the bottom portion to close off the bottom portion; and a nut butter and jelly food slice consisting of a first layer of jelly, a layer of nut butter disposed on and of substantially equal planar dimension to the first layer of jelly, and a second layer of jelly disposed on and of substantially equal planar dimension to the layer of nut butter, disposed within the bottom portion with the nut butter layer encapsulated by the jelly layers and the flexible package covering when said top portion thereof closes off said bottom portion thereof.

4. The food product of claim 3 wherein the bottom portion of the flexible package covering comprises a bottom wall and at least one side wall connected to the bottom wall, and the bottom wall and the at least one side wall cooperating to define the upwardly open area.

5. A pre-formed food slice to be encapsulated within a flexible package covering, consisting of:

a pre-formed layer of jelly dimensioned to fit on a food substrate;

a layer of nut butter disposed on and of substantially equal planar dimension to said first layer of jelly; and a second layer of jelly disposed on and of substantially equal planar dimension to said first layer of jelly and said layer of nut butter.

6. The food slice of claim 5 wherein the shape of the food slice is selected from the group consisting of round, square, symmetrical and asymmetrical shapes.

7. The pre-formed food slice of claim 5 dimensioned to fit on a slice of bread.

8. The pre-formed food slice of claim 7 wherein food slice is about 3.5 inches wide and about 4 inches long.

9. The pre-formed food slice of claim 7 wherein the food slice is about ⅜ inch thick.

10. The pre-formed food slice of claim 9 wherein the food slice comprises two layers of jelly and a layer of nut butter in between the layers of jelly, each layer being about ⅛ inch thick.

11. A pre-packaged food product comprising:

a flexible package covering comprising:

a bottom portion defining an upwardly open area, and a top portion connected to the bottom portion and removably extending over the upwardly open area defined by the bottom portion to close off the bottom portion; and the food slice of claim 5 disposed within the bottom portion and encapsulated within the flexible package covering when said top portion thereof closes off said bottom portion.

12. The food product of claim 11 wherein the bottom portion of the flexible package covering comprises a bottom wall and at least one side wall connected to the bottom wall, the bottom wall and the at least one side wall cooperating to define the upwardly open area.

13. A food product package comprising:

a food container comprising:

a bottom wall, at least one raised perimeter wall connected to the bottom wall, the bottom wall and the at least one raised perimeter wall defining a recess therebetween, and a cover at least partially removably secured to the at least one raised perimeter wall; and a plurality of pre-packaged food products of claim 5 disposed within said food container.

14. A food product package comprising:

a food container comprising:

a bottom wall, at least one raised perimeter wall connected to the bottom wall, the bottom wall and the at least one raised perimeter wall defining a recess therebetween, and a cover at least partially removably secured to the at least one raised perimeter wall; and a plurality of pre-packaged food products of claim 3 disposed within said food container.

*15. A pre-packaged food product comprising:*

*a flexible package covering comprising:*

*a bottom portion including a food slice area; and*

*a top portion connected to the bottom portion and removably extending over the food slice area of the bottom portion; and*

*a food slice disposed on the food slice area of the bottom portion and encapsulated within the flexible package covering when the top portion extends over the food slice area, the food slice consisting of:*

*a pre-formed layer of jelly dimensioned to fit on a food substrate; and*

*a layer of nut butter disposed on and of substantially equal planar dimension to the layer of jelly;*

*wherein the food slice is of such consistency and dimensions that the food slice can be rolled up.*

*16. A food product package comprising:*

*a container comprising:*

*a bottom wall;*

*at least one raised perimeter wall connected to the bottom wall, the bottom wall and the at least one raised perimeter wall defining a recess therebetween; and*

*a cover at least partially removably secured to the at least one raised perimeter wall; and*

*a plurality of food products of claim 15 disposed within the container.*

*17. A food product as in claim 15 wherein the bottom portion comprises a bottom wall and at least one side wall connected to the bottom wall, the bottom wall and the at least one side wall cooperating to define the food slice area.*

*18. A food product as in claim 15 wherein a shape of the food slice is selected from a group consisting of round, square, symmetrical and asymmetrical shapes.*

*19. A food product as in claim 15 wherein the food slice is dimensioned to fit on a slice of bread.*

*20. A food product as in claim 15 wherein the food slice is about 3.5 inches wide and about 4 inches long.*

*21. A food product as in claim 15 wherein the food slice is less than about ⅜ inch thick.*

*22. A food product as in claim 15 wherein the nut butter is peanut butter.*

* * * * *